United States Patent
Halepovic et al.

(10) Patent No.: US 11,627,046 B2
(45) Date of Patent: *Apr. 11, 2023

(54) APPARATUS AND METHOD FOR SELECTING A BANDWIDTH PREDICTION SOURCE

(71) Applicant: AT&T Intellectual Property I, L.P., Atlanta, GA (US)

(72) Inventors: Emir Halepovic, Somerset, NJ (US); Matteo Varvello, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/087,243

(22) Filed: Nov. 2, 2020

(65) Prior Publication Data

US 2021/0051073 A1   Feb. 18, 2021

Related U.S. Application Data

(63) Continuation of application No. 16/213,624, filed on Dec. 7, 2018, now Pat. No. 10,868,726.

(51) Int. Cl.
*H04L 12/24* (2006.01)
*H04L 12/26* (2006.01)
(Continued)

(52) U.S. Cl.
CPC ........ *H04L 41/0896* (2013.01); *H04L 41/147* (2013.01); *H04L 41/5009* (2013.01);
(Continued)

(58) Field of Classification Search
CPC ..... H04L 12/5695; H04L 47/10; H04L 47/15; H04L 41/0896; H04L 41/147;
(Continued)

(56) References Cited

U.S. PATENT DOCUMENTS

| 5,884,037 A | 3/1999 | Aras et al. |
|---|---|---|
| 6,269,078 B1 | 7/2001 | Lakshman et al. |

(Continued)

FOREIGN PATENT DOCUMENTS

| EP | 2557830 A1 | 2/2013 |
|---|---|---|
| WO | 2009149100 A1 | 12/2009 |

(Continued)

OTHER PUBLICATIONS

Yi Sun et al., (CS2P: Improving Video Bitrate Selection and Adaptation with Data-Driven Throughput Prediction, SIGCOMM'16, Aug. 22-26, Florianopolis, Brazil, 2016, 2016 ACM. ISBN 978-1-4503-4193-6/1608, now onwards Yi Sun). (Year: 2016).*

(Continued)

*Primary Examiner* — Peter G Solinsky
*Assistant Examiner* — Sanjay K Dewan
(74) *Attorney, Agent, or Firm* — Guntin & Gust, PLC; Robert Gingher

(57) ABSTRACT

Aspects of the subject disclosure may include, for example, obtaining, from a first source of information, a first bandwidth prediction, wherein the first bandwidth prediction is based upon historical bandwidth data that had been provided by a plurality of devices; obtaining, from a second source of information, a second bandwidth prediction, wherein the second bandwidth prediction is based upon network measurements, and wherein the network measurements are other than the historical bandwidth data that had been provided by the plurality of devices; selecting as a source of a future bandwidth prediction one of the first source of information and the second source of information, wherein the selecting is based upon a comparison of each of the first bandwidth prediction and the second bandwidth prediction to an actually obtained bandwidth of the device. Other embodiments are disclosed.

20 Claims, 11 Drawing Sheets

(51) Int. Cl.
  *H04N 21/2385* (2011.01)
  *H04L 41/0896* (2022.01)
  *H04L 41/5009* (2022.01)
  *H04L 41/50* (2022.01)
  *H04L 43/062* (2022.01)
  *H04L 43/0876* (2022.01)
  *H04L 41/147* (2022.01)

(52) U.S. Cl.
  CPC .......... *H04L 41/509* (2013.01); *H04L 43/062* (2013.01); *H04L 43/0876* (2013.01); *H04N 21/2385* (2013.01)

(58) Field of Classification Search
  CPC . H04L 41/5009; H04L 41/509; H04L 43/062; H04L 43/0876; H04N 21/2385; H04J 3/1682; H04Q 11/0478
  USPC ........................................................ 370/468
  See application file for complete search history.

(56) References Cited

U.S. PATENT DOCUMENTS

| | | | |
|---|---|---|---|
| 6,707,862 B1 | 3/2004 | Larsson | |
| 6,842,463 B1 | 1/2005 | Drwiega et al. | |
| 6,912,229 B1 | 6/2005 | Lauro et al. | |
| 7,047,309 B2 | 5/2006 | Baumann et al. | |
| 7,174,178 B2 | 2/2007 | Bergel | |
| 7,310,682 B2 | 12/2007 | Hatime | |
| 7,415,038 B2 * | 8/2008 | Ullmann | H04L 41/0213 370/468 |
| 7,499,453 B2 * | 3/2009 | Carlson | H04L 45/245 370/395.2 |
| 7,535,839 B2 | 5/2009 | Kadaba et al. | |
| 7,536,469 B2 | 5/2009 | Chou et al. | |
| 7,545,749 B2 | 6/2009 | Jourdain et al. | |
| 7,630,401 B2 * | 12/2009 | Iwamura | H04L 47/15 370/468 |
| 7,650,421 B2 | 1/2010 | Patrick et al. | |
| 7,743,183 B2 | 6/2010 | Virdi et al. | |
| 7,796,514 B2 | 9/2010 | Noriega | |
| 7,797,723 B2 | 9/2010 | Demircin et al. | |
| 8,307,108 B2 | 11/2012 | Chen et al. | |
| 8,391,896 B2 | 3/2013 | Curcio et al. | |
| 8,396,983 B1 | 3/2013 | Inskip et al. | |
| 8,443,404 B2 | 5/2013 | Chetlur et al. | |
| 8,503,336 B2 | 8/2013 | Rappaport et al. | |
| 8,577,330 B2 | 11/2013 | Reagor | |
| 8,644,154 B2 | 2/2014 | Vivanco et al. | |
| 8,713,195 B2 | 4/2014 | Pickens et al. | |
| 8,804,515 B2 | 8/2014 | Kampmann et al. | |
| 8,812,673 B2 | 8/2014 | Balachandran et al. | |
| 8,854,958 B2 | 10/2014 | Gell et al. | |
| 8,959,244 B2 | 2/2015 | Lin et al. | |
| 9,037,099 B2 | 5/2015 | Li et al. | |
| 9,191,284 B2 | 11/2015 | Kordasiewicz et al. | |
| 9,191,322 B2 | 11/2015 | Schlack et al. | |
| 9,237,361 B2 | 1/2016 | Youssefmir et al. | |
| 9,306,994 B2 | 4/2016 | Gahm et al. | |
| 9,331,944 B2 | 5/2016 | Swenson et al. | |
| 9,344,476 B2 | 5/2016 | Kampmann et al. | |
| 9,438,393 B2 | 9/2016 | Kobayashi et al. | |
| 9,462,032 B2 | 10/2016 | Lieber | |
| 9,485,289 B2 | 11/2016 | Zhu et al. | |
| 9,496,984 B2 | 11/2016 | Christoffersson et al. | |
| 9,503,384 B1 * | 11/2016 | Oliveira | H04L 43/0882 |
| 9,553,803 B2 | 1/2017 | Xiao et al. | |
| 9,608,934 B1 | 3/2017 | Kalman et al. | |
| 9,635,080 B2 | 4/2017 | Karlsson et al. | |
| 9,654,361 B2 | 5/2017 | Vasseur et al. | |
| 9,661,515 B2 | 5/2017 | Lord et al. | |
| 9,699,489 B2 | 7/2017 | Iwamura | |
| 9,756,112 B2 | 9/2017 | Jana et al. | |
| 9,763,137 B2 | 9/2017 | Allanki et al. | |
| 9,775,160 B2 | 9/2017 | Schmidt | |
| 9,800,912 B2 | 10/2017 | Phillips et al. | |
| 9,832,503 B2 | 11/2017 | Phillips | |
| 9,838,893 B2 | 12/2017 | Grinshpun et al. | |
| 9,979,663 B2 | 5/2018 | Robitaille | |
| 9,992,690 B2 | 6/2018 | Butchko et al. | |
| 10,062,036 B2 | 8/2018 | Mermoud et al. | |
| 10,097,404 B2 | 10/2018 | Yadav et al. | |
| 10,178,043 B1 | 1/2019 | Ganjam et al. | |
| 10,397,123 B2 | 8/2019 | Jana et al. | |
| 2002/0131496 A1 | 9/2002 | Vasudevan et al. | |
| 2003/0086514 A1 | 5/2003 | Ginis et al. | |
| 2004/0259555 A1 | 12/2004 | Rappaport et al. | |
| 2005/0124347 A1 | 6/2005 | Hosein | |
| 2005/0289618 A1 | 12/2005 | Hardin | |
| 2006/0003767 A1 | 1/2006 | Kim et al. | |
| 2006/0067214 A1 | 3/2006 | Ramachandran | |
| 2006/0121908 A1 | 6/2006 | Kikinis | |
| 2006/0256130 A1 | 11/2006 | Gonzalez | |
| 2007/0002743 A1 | 1/2007 | Fan | |
| 2007/0153916 A1 | 7/2007 | Demircin et al. | |
| 2007/0217448 A1 * | 9/2007 | Luo | H04L 47/10 370/468 |
| 2007/0286213 A1 | 12/2007 | Fodor et al. | |
| 2009/0028182 A1 | 1/2009 | Brooks et al. | |
| 2010/0121977 A1 | 5/2010 | Kontola et al. | |
| 2010/0312905 A1 | 12/2010 | Sandmann et al. | |
| 2011/0106969 A1 | 5/2011 | Choudhury et al. | |
| 2011/0119370 A1 | 5/2011 | Huang et al. | |
| 2011/0219142 A1 | 9/2011 | Lin et al. | |
| 2012/0004960 A1 | 1/2012 | Ma et al. | |
| 2012/0005365 A1 | 1/2012 | Ma et al. | |
| 2012/0157106 A1 | 6/2012 | Wang et al. | |
| 2012/0157147 A1 | 6/2012 | Christoffersson et al. | |
| 2012/0257671 A1 | 10/2012 | Brockmann et al. | |
| 2012/0265892 A1 | 10/2012 | Ma et al. | |
| 2012/0331106 A1 | 12/2012 | Ramamurthy et al. | |
| 2013/0007831 A1 | 1/2013 | Wu et al. | |
| 2013/0035107 A1 | 2/2013 | Chan et al. | |
| 2013/0133011 A1 | 5/2013 | Chhaochharia et al. | |
| 2013/0263167 A1 | 10/2013 | Parthasarathy et al. | |
| 2013/0322242 A1 | 12/2013 | Swenson et al. | |
| 2014/0082192 A1 | 3/2014 | Wei | |
| 2014/0098748 A1 | 4/2014 | Chan et al. | |
| 2014/0143440 A1 | 5/2014 | Ramamurthy et al. | |
| 2014/0146693 A1 | 5/2014 | Chetlur et al. | |
| 2016/0014620 A1 | 1/2016 | Narayanan et al. | |
| 2016/0028647 A1 | 1/2016 | Ramakrishnan et al. | |
| 2016/0044133 A1 | 2/2016 | Gibbon et al. | |
| 2016/0127754 A1 | 5/2016 | Lee et al. | |
| 2016/0135076 A1 | 5/2016 | Grinshpun et al. | |
| 2016/0234078 A1 | 8/2016 | Jana et al. | |
| 2016/0261514 A1 | 9/2016 | Gopinathan et al. | |
| 2016/0301770 A1 | 10/2016 | Marra et al. | |
| 2016/0353299 A1 | 12/2016 | Sayeed et al. | |
| 2016/0366565 A1 | 12/2016 | Fjelberg et al. | |
| 2017/0054648 A1 | 2/2017 | Ngo-Tan et al. | |
| 2017/0085950 A1 | 3/2017 | Halepovic | |
| 2017/0149690 A1 | 5/2017 | Le Rudulier et al. | |
| 2017/0202000 A1 | 7/2017 | Fu et al. | |
| 2017/0244639 A1 | 8/2017 | Szilagyi et al. | |
| 2017/0331752 A1 | 11/2017 | Jana | |
| 2018/0027039 A1 | 1/2018 | Moorthy et al. | |
| 2018/0027130 A1 | 1/2018 | Yermakov et al. | |
| 2018/0054377 A1 | 2/2018 | Polychronis | |
| 2018/0103283 A1 | 4/2018 | Liu et al. | |
| 2018/0137412 A1 | 5/2018 | Nikkhah et al. | |
| 2018/0139261 A1 | 5/2018 | Sintorn et al. | |
| 2018/0167179 A1 | 6/2018 | Huang et al. | |
| 2018/0176624 A1 | 6/2018 | Phillips et al. | |
| 2018/0234320 A1 | 8/2018 | Paulraj et al. | |
| 2018/0295056 A1 | 10/2018 | Xiao et al. | |
| 2019/0246094 A1 | 8/2019 | Mate et al. | |
| 2019/0334794 A1 | 10/2019 | Halepovic et al. | |
| 2019/0334824 A1 | 10/2019 | Jana et al. | |
| 2020/0076520 A1 | 3/2020 | Jana et al. | |
| 2020/0186430 A1 * | 6/2020 | Halepovic | H04N 21/6373 |

(56) References Cited

U.S. PATENT DOCUMENTS

| | | |
|---|---|---|
| 2020/0252147 A1 | 8/2020 | Jana et al. |
| 2020/0296442 A1 | 9/2020 | Halepovic |
| 2021/0184979 A1 | 6/2021 | Jana et al. |

FOREIGN PATENT DOCUMENTS

| | | |
|---|---|---|
| WO | 2010060106 A1 | 5/2010 |
| WO | 2010085043 A2 | 7/2010 |
| WO | 2016123497 A1 | 8/2016 |
| WO | 2017058247 A1 | 4/2017 |
| WO | 2017084723 A1 | 5/2017 |
| WO | 2017127000 A1 | 7/2017 |
| WO | 2017166119 A1 | 10/2017 |
| WO | WO2018082988 | 5/2018 |

OTHER PUBLICATIONS

"Home ■ Dash-Industry-Forum/dash.js Wiki ■ GitHub", https://github.com/Dash-Industry-Forum/dash.js/wiki, May 15, 2018, 5 pp.

"ISO/IEC FDIS 23009-5:2017: Information Technology—Dynamic adaptive streaming over HTTP (DASH)", Part 5: Server and network assisted DASH (SAND), 2017, 11 pp.

"ITU-T P.1203: Objective video QoE standard", https://www.itu.int/rec/T-REC-P.1203, 2016.

"Slow but Steady: Cap-based Client-Network Interaction for Improved Streaming Experience", Jun. 4, 2018, 10pgs.

"VQEG: Objective video quality assessment", https://www.its.bldrdoc.gov/vqeg/projects/audiovisual-hd.aspx, 2018, 3 pp.

Agboma, et al., "Quality of experience management in mobile content delivery systems." Telecommunication Systems 49.1 (2012): 85-98., Jun. 24, 2010.

Akhshabi, Saamer, et al., "Serverbased traffic shaping for stabilizing oscillating adaptive streaming players", Proc. ACM NOSSDAV, 2013, 4 pp.

Arestrom, Erik, "Flow Classification of Encrypted Traffic Streams using Multifractal Features", https://liu.diva-portal.org/smash/get/diva2:1220169/FULLTEXT01.pdf, Linkoping University,, 2018.

Benno, S., et al., "Adaptive streaming: The network HAS to help", Bell Lab. Tech. Journal, 2011, 7 pp.

Bentaleb, Abdelhak, "SDNDASH: Improving QoE of HTTP Adaptive Streaming Using Software Defined Networking", Proc. ACM MMSyS, 2016, 10 pp.

Bhat, Divyashri, , "Network Assisted Content Distribution for Adaptive Bitrate Video Streaming", Proc. MMSys, 2017, 14 pp.

Bouten, Niels, et al., "In-Network Quality Optimization for Adaptive Video Streaming Services", IEEE Trans. on Multimedia, vol. 16, No. 8, pp. 2281-2293, 2014, 1 p.

Bouten, Niels, "QoE-Driven In-Network Optimization for Adaptive Video Streaming Based on Packet Sampling Measurements", Computer Networks, 2015, 20 pp.

Carbone, Marta et al., "Dummynet revisited", ACM SIGCOMM Computer Communication Review, vol. 40, pp. 12-20, 2010., 2010, 8 pp.

Casas, Pedro, et al., "YOUQMON: A System for Online Monitoring of YouTube QoE in Operational 3G Networks", ACM Sigmetrics Perform. Eval. Rev., vol. 41, pp. 44-46, 2013, 4 pp.

Choi, Sunghyun et al., "Predictive and Adaptive Bandwidth Reservation for Hand-Offs in QoS-Sensitive Cellular Networks", ACM SIGCOMM Computer Communication Review. vol. 28. No. 4. ACM, 1998, 12 pages.

Cofano, G., et al., "Design and Experimental Evaluation of Network-assisted Strategies for HTTP Adaptive Streaming", Proc. ACM MMSyS, 2016, 12 pp.

Covell, Michele et al., "Calibration and Prediction of Streaming-Server Performance", HP Labs Tecnical Report HPL-2004-206 (2004)., 2004, 13 pages.

Dimopoulos, Georgios, et al., "Measuring Video QoE from Encrypted Traffic", Proc. IMC, 2016., 2016, 14 pp.

Dobrian, Florin, et al., "Understanding the Impact of Video Quality on User Engagement", SIGCOMM'11, Aug. 15-19, 2011, Toronto, Ontario, Canada., 2011, 12 pp.

Elo, Hans-Filip , "Exploring web protocols for use on cellular networks: QUIC on poor network links", https://liu.diva-portal.org/smash/get/diva2:1220465/FULLTEXT01.pdf, Linkoping University, 2017.

Flach, Tobias, et al., "An Internet-Wide Analysis of Traffic Policing", University of Southern California; Google; Proc. ACM SIGCOMM, 2016, 15 pp.

Haakon, Riiser et al., "Bitrate and video quality planning for mobile streaming scenarios using a GPS-based bandwidth lookup service." Multimedia and Expo (ICME), 2011 IEEE International Conference on. IEEE, 2011.

Hamer, Greg, , "Open Source Media Framewrok Introduction and Overview Adobe Developer Connection", https://www.adobe.com/devnet/video/articles1/osmf_overview.html, 2010, 9 pp.

He, Lijun et al., "Content and buffer status aware packet scheduling and resource management framework for video streaming over LTE system", EURASIP Journal on Image and Video Processing Jan. 2017, 73, 2017.

Hobfeld, Tobias, et al., "Identifying QoE Optimal Adaptation of HTTP Adaptive Streaming Based on Subjective Studies", Computer Networks, 2015, 2015, 23 pp.

Houdaille, Remi, , "Shaping HTTP adaptive streams for a better user experience", Proc. ACM MMSys,, 2012, 4 pp.

Huang, Te-Yuan, et al., "Confused, Timid, and Unstable: Picking a Video Streaming Rate is Hard", Stanford University {huangty,nikhilh,brandonh,nickm,ramesh.johari}@stanford.edu, 2012, 14 pp.

Kakhki, Arash Molavi, et al., BingeOn Under the Microscope: Understanding T-Mobile's Zero-Rating Implementation, Proc. Internet—QoE Workshop, 2016, 6 pp.

Kamel, Ammar M., "Client-Based QoS Monitoring and Evaluation Architecture for Network Infrastructure and Services", Western Michigan University ScholarWorks at WMU, Dec. 2013, 130 pages.

Kleinrouweler, Jan Willem, et al., "Delivering Stable High-Quality Video: An SDN Architecture with DASH Assisting Network Elements", Proc. ACM MMSyS, 2016, 10 pp.

Krishnamoorthi, Vengatanathan et al., "978-1-5386-2542-2/18/$31.00 2018 IEEE", Slow but Steady: Cap-based Client-Network Interaction for Improved Streaming Experience, 2018, 10.

Krishnamoorthi, Vengatanathan, "Helping Hand or Hidden Hurdle: Proxy-assisted HTTP-based Adaptive Streaming Performance", IEEE Mascots, 2013, 10 pp.

Krishnamoorthi, Vengatanathan et al., "Slow but Steady: Capbased Client-Network Interaction for Improved Streaming Experience", Authors Version—Proceedings of the IEEE/ACM International Symposium on Quality of Service (IEEE/ACM IWQoS), 2018.

Krishnamoorthi, Vengatanathan et al., "Slow but Steady: Capbased Client-Network Interaction for Improved Streaming Experience", 978-1-5386-2542-2/18 c 2018 IEEE, Jun. 2018, 10pgs.

Krishnamoorthi, Vengatanathan, , "BUFFEST: Predicting Buffer Conditions and Realtime Requirements of HTTP(S) Adaptive Streaming Clients", Proc. ACM MMSys,, 2017, 13 pp.

Krishnamoorthi, Vengatanathan, et al., "Quality-adaptive Prefetching for Interactive Branched Video using HTTP-based Adaptive Streaming", ACM 978-1-4503-3063, 2014, 10 pp.

Krishnan, S. Shunmuga, et al., "Video Stream Quality Impacts Viewer Behavior: Inferring Causality Using Quasi-Experimental Designs", IMC'12, Nov. 14-16, 2012, Boston, Massachusetts, USA, 2012, 14 pp.

Mangla, Tarun, et al., "MIMIC: Using passive network measurements to estimate HTTP-based adaptive video QoE metrics", Proc. IEEE/IFIP TMA, 2017, 6 pp.

Mangla, Tarun, et al., "VideoNOC: Assessing Video QoE for Network Operators Using Passive Measurements", Proc. MMSys, Jun. 12, 2018, 12 pp.

Oyman, et al., "Quality of experience for HTTP adaptive streaming services." Communications Magazine, IEEE 50.4 (2012): 20-27.

Petrangeli, Stefano, et al., "Software-Defined Network-based Prioritization to Avoid Video Freezes in HTTP Adaptive Streaming", Int. Journ. of Netw. Management, 2016, 23 pp.

(56) References Cited

OTHER PUBLICATIONS

Qadir, Qahhar Muhammad, et al., "Mechanisms for QoE optimisation of Video Traffic: A review paper", Australasian Journal of Information, Communication Technology and Applications, 2015, 18 pp.

Rao, Ashwin, et al., "Network Characteristics of Video Streaming Traffic", ACM CoNEXT,, 2011, 12 pp.

Riiser, Haakon, et al., "Commute Path Bandwidth Traces from 3G Networks: Analysis and ApplicationsCommute Path Bandwidth Traces from 3G Networks: Analysis and Applications", Proc. ACM MMSys,, 2013, 5 pp.

Spiteri, Kevin, et al., "BOLA: Near-Optimal Bitrate Adaptation for Online Videos", IEEE Infocom, 2016, 12 pp.

Spiteri, Kevin, et al., "From Theory to Practice: Improving Bitrate Adaptation in the DASH Reference Player", 2018 Copyright held by the owner/author(s). Publication rights licensed to Association for Computing Machinery. ACM ISBN 978-1-4503-5192-8/18/06. https://doi.org/10.1145/3204949.3204953, Jun. 12, 2018, 15 pp.

Sun, Yi et al., "CS2P: Improving Video Bitrate Selection and Adaptation with Data-Driven Throughput Prediction, SIGCOMM", 16, August 22-26, Florianopolis, Brazil, 2016 ACM. ISBN978-1-4503-4193-6/1608) (Year: 2016), 2016, 14pgs.

Tumuluru, Vamsi K. et al., "Channel status prediction for cognitive radio networks", Wireless Communications and Mobile Computing 12.10 (2012): 862-874, 2012, 13 pages.

Vleeschauwer, D. D., et al., "Optimization of http adaptive streaming over mobile cellular networks", Proc. IEEE Infocom, 2013, 2 pp.

Wu, Tingyao, et al., "Network-based video freeze detection and prediction in HTTP adaptive streaming", Comp. Comm., vol. 99, pp. 37-47, 2017, 3 pp.

Yanggratoke, Rerngvit et al., "Predicting Real-time Service-level Metrics from Device Statistics", KTH Technical Report TRITA-EE, 2014:053; URN:NBN:SE:KTH:DIVA-152637., Sep. 29, 2014, 9 pages.

Yin, Sixing et al., "Prediction-Based Throughput Optimization for Dynamic Spectrum Access", IEEE transactions on vehicular technology 60.3 (2011): 1284-1289., Mar. 2011, 6 pages.

Zahran, Ahmed H., , "SAP: Stall-Aware Pacing for Improved DASH Video Experience in Cellular Networks", Proc. ACM MMSys, 2017, 15 pp.

Zhi, Li, et al., "Probe and Adapt: Rate Adaptation for HTTP Video Streaming At Scale", IEEE Journal on Selected Areas in Communications, 2014, 15 pp.

Zou, Xuan K. et al., "Can accurate predictions improve video streaming in cellular networks?", Proceedings of the 16th International Workshop on Mobile Computing Systems, Feb. 2015, 6 pages.

\* cited by examiner

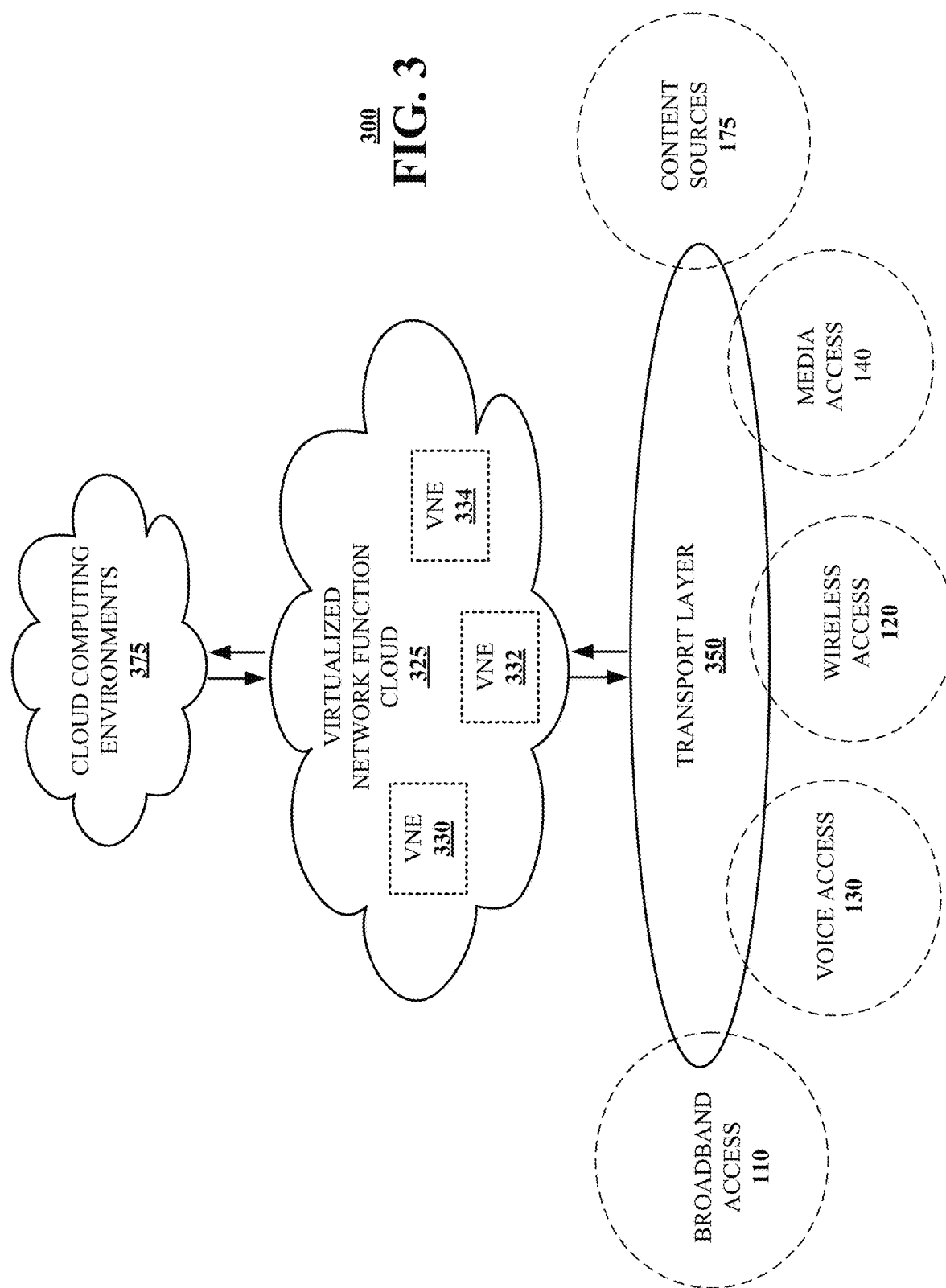

APPARATUS AND METHOD FOR SELECTING A BANDWIDTH PREDICTION SOURCE

CROSS-REFERENCE TO RELATED APPLICATIONS

This application is a continuation of U.S. application Ser. No. 16/213,624 filed on Dec. 7, 2018. All sections of the aforementioned application are incorporated herein by reference in its entirety.

FIELD OF THE DISCLOSURE

The subject disclosure relates to an apparatus and method for selecting a bandwidth prediction source. In one example, the selecting can comprise selecting the best bandwidth prediction source for a video client at a given time.

BACKGROUND

Predictive video adaptation is an emerging paradigm following the tremendous growth of Over The Top (OTT) video streaming. Video is currently the most prominent traffic type, and ever growing both due to new technologies (e.g., 360 video, augmented reality (AR), virtual reality (VR)) and new video platforms (e.g., PERISCOPE and TWITCH). Improving user experience when watching videos on-line is important both for content providers and Internet Service Providers. The conventional state-of-the-art for on-line video streaming typically adapts the video quality based on network conditions. Many different algorithms exist, but they generally monitor the achieved local throughput to decide on the quality of future chunks (that is, future portions of a video) or use network-based prediction according to historical throughput data to decide on the quality of future chunks.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for selecting a bandwidth prediction source. In one example, the selecting can comprise selecting the best bandwidth prediction source for a video client at a given time. Other embodiments are described in the subject disclosure.

In one embodiment, multiple sources of prediction can be utilized: (i) local historical data (e.g., local historical throughput data); (ii) network historical data (e.g., network-wide historical throughput data that is reported by and/or obtained from a plurality of devices (essentially a large pool of "local historical throughput data")); and/or (iii) network measurement-based data (e.g., from internal network metrics). In one specific example, each of local predictions (based, for example, upon the above-mentioned local historical throughput data), network historical predictions (based, for example, upon the above-mentioned network historical throughput data), and network measurement-based predictions (based, for example, upon the above-mentioned internal network metrics) can be validated against a determination of actual activity (e.g., locally obtained throughput). The determination of actual activity can be obtained, for example, over the period predicted by any of the sources. Then, it can be decided which one (or more) of the sources is best to use for the next decision or series of decisions. In another specific example, the best bandwidth prediction source at any given time may not be the same throughout the same video session or across video sessions. In another specific example, there is no need to make a commitment towards a bandwidth prediction source ahead of time—simply use some or all of the available bandwidth prediction source(s) in real-time. In another specific example, one bandwidth prediction source can be used as a primary source, another bandwidth prediction source can be used as a secondary source, yet another bandwidth prediction source can be used as a tertiary source, etc. In another specific example, a process to tune or refine the decision that the primary source suggests can be carried out.

Figure 1:
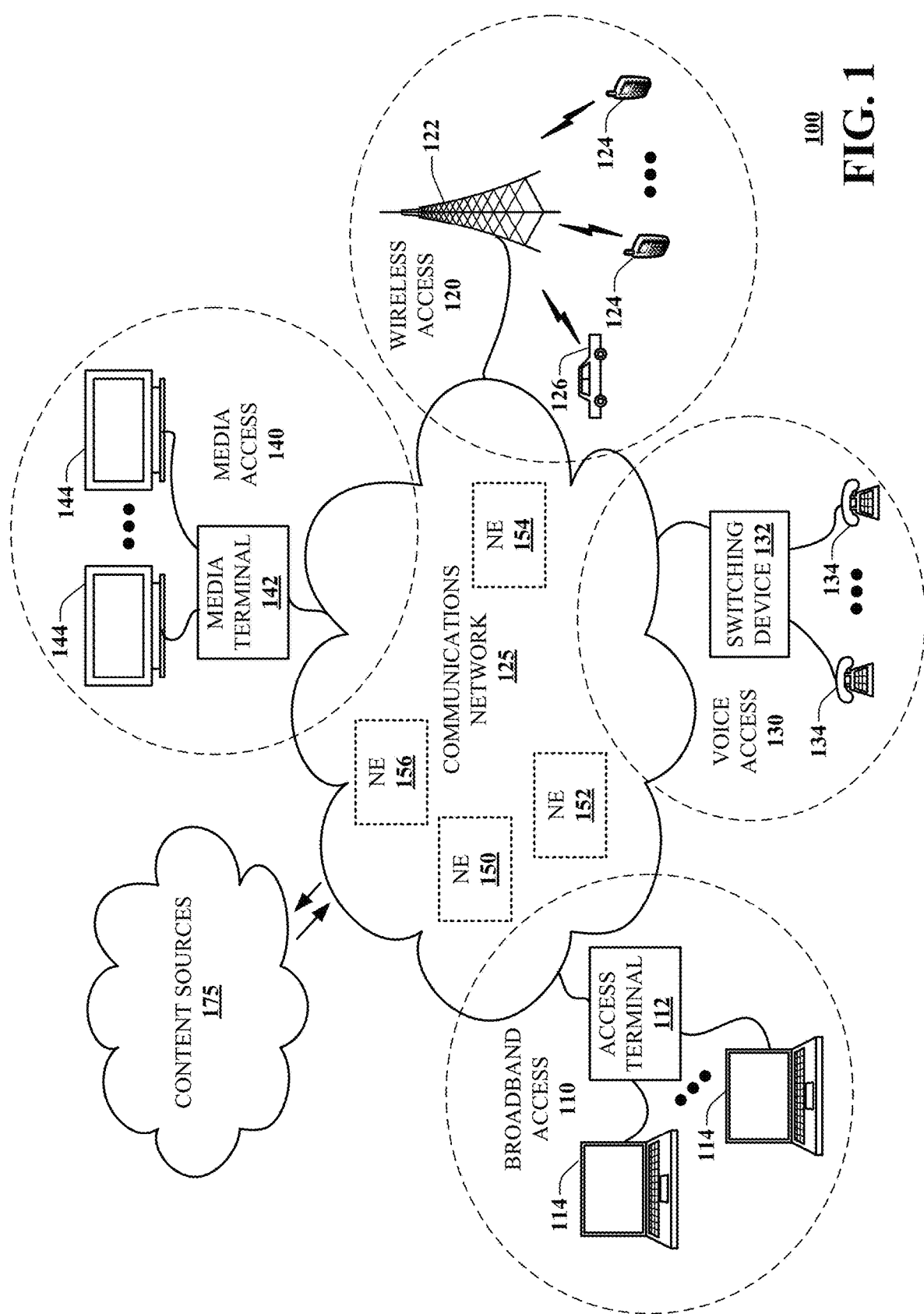
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
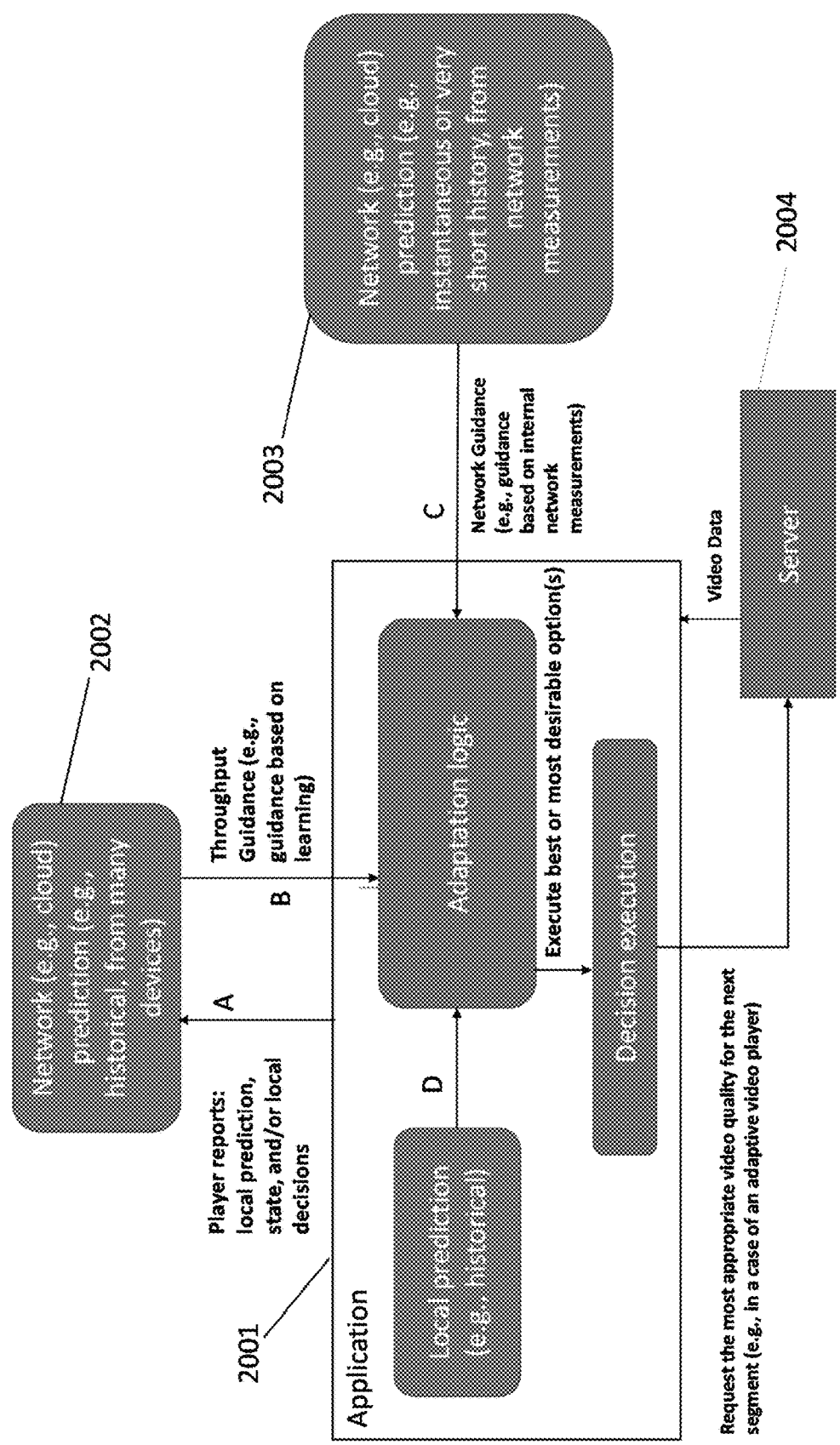
FIG. 2A is a block diagram illustrating an example, non-limiting embodiment of a system 2000 (which can function, for example, fully or partially within the communication network 100 of FIG. 1) in accordance with various aspects described herein.

Referring now to FIG. 2A, this is a block diagram illustrating an example, non-limiting embodiment of a system 2000 (all or part of which can function within the communication network 100 of FIG. 1) in accordance with various aspects described herein. As seen in this FIG. 2A, an application 2001 (which can run, for example, on a video player) can make a local prediction (e.g., based on local historical information accessible by the application/video player). The local prediction (which can be a future bandwidth prediction) by the application/video player can be reported to a network mechanism 2002 in the cloud (see arrow "A"). In addition, the application/video player can report to the network mechanism 2002 in the cloud various states (e.g., buffer level) of the application/video player as well as various decisions (e.g., video quality level requests) that have been made by the application/video player (see, again, arrow "A"). The mechanism 2002 in the cloud can provide to the application/video player throughput guidance (see arrow B). This throughput guidance can be guidance based upon learning (e.g., machine learning). This throughput guidance can be based upon historical data from many devices (e.g., various devices that communicate with a given network). This throughput guidance can provide predictions and/or can tell the application/player what to do (e.g., what video quality to request for a subsequent video segment). In addition, mechanism 2003 in the cloud can provide to the application/video player network guidance (see arrow C). The network guidance can comprise and/or be based upon network measurements (e.g., signal to noise ratio, signal quality, radio resource utilization). The network guidance can inform the application/video player of network conditions (and/or can provide one or more throughput predictions based upon such network measurements). The application logic (of the application/video player) can receive the inputs B and C (as well as local historical-based predictions shown at arrow D) and can make one or more decisions as to which type of prediction (e.g., local historical throughput, network historical throughput and/or network measurement-based) and/or which prediction source (e.g., 2001, 2002, and/or 2003) to utilize. In one example, the information sent at arrow "D" can have been summarized. In another example, the information sent at arrow "D" can be the result of analysis. Once a decision is made (or decisions are made) as to which type of prediction to utilize and/or which prediction source to utilize, the application/video player can determine the most appropriate video quality to request from server 2004 when the application/video player requests the next segment of video (see the block labeled "Decision Execution"). The application/video player can then receive the video data and present the video to a user.

In one example, the network measurements can be collected continuously, at sub-second or at about 1-second granularity. In another example, the network measurements can be collected for all devices connected (e.g. phones, cars, shipping containers, etc.) In another example, the network measurements can be collected only for those devices for which throughput guidance is deemed to be useful. In one specific example, the network measurements can be collected only for consumer devices that can stream video. In another specific example, the network measurements can instead (or also) be collected for cars (e.g., for firmware updates and/or in-car entertainment system/WiFi). In another example, the network measurements can be collected for one or more specific "Services" (e.g., when the network operator (e.g., provider of guidance) and service provider (e.g., whose app/service uses the guidance) have an "agreement" that such an app/service will use the guidance).

In one specific example, wherein the network measurements are collected for one or more specific "Services", a mechanism can be set up where the measurements relevant to only the devices running this app/service would be collected. In one example, the network measurements can be collected in some parts of the network. In another example, the network measurements can be collected in all parts of the network. In another example, all radio cells would be subject to network measurements.

Figure 2B:
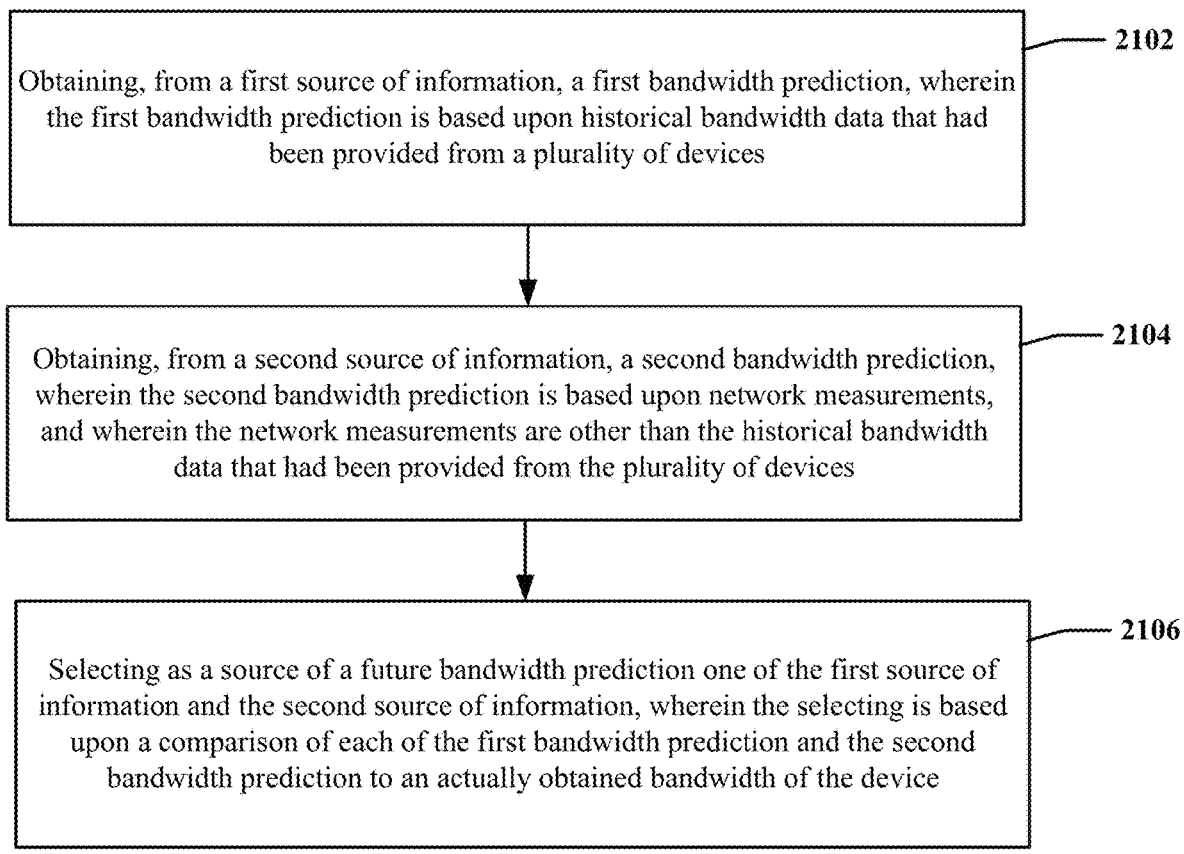
FIG. 2B depicts an illustrative embodiment of a method in accordance with various aspects described herein.

Referring now to FIG. 2B, various steps of a method 2100 according to an embodiment are shown. As seen in this FIG. 2B, step 2102 comprises obtaining, from a first source of information, a first bandwidth prediction, wherein the first bandwidth prediction is based upon historical bandwidth data that had been provided from a plurality of devices. In one example, the historical bandwidth data can be provided to a network from the plurality of devices. In another example, the first bandwidth prediction can be based upon, for example, individual bandwidth that had been provided to various devices and/or based upon an aggregated bandwidth that had been provided to the various devices. Next, step 2104 comprises obtaining, from a second source of information, a second bandwidth prediction, wherein the second bandwidth prediction is based upon network measurements, and wherein the network measurements are other than the historical bandwidth data that had been provided from the plurality of devices (the network measurements can be based upon, for example, communications with individual devices and/or based upon aggregated communication with multiple devices). Next, step 2106 comprises selecting as a source of a future bandwidth prediction one of the first source of information and the second source of information, wherein the selecting is based upon a comparison of each of the first bandwidth prediction and the second bandwidth prediction to an actually obtained bandwidth of the device.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
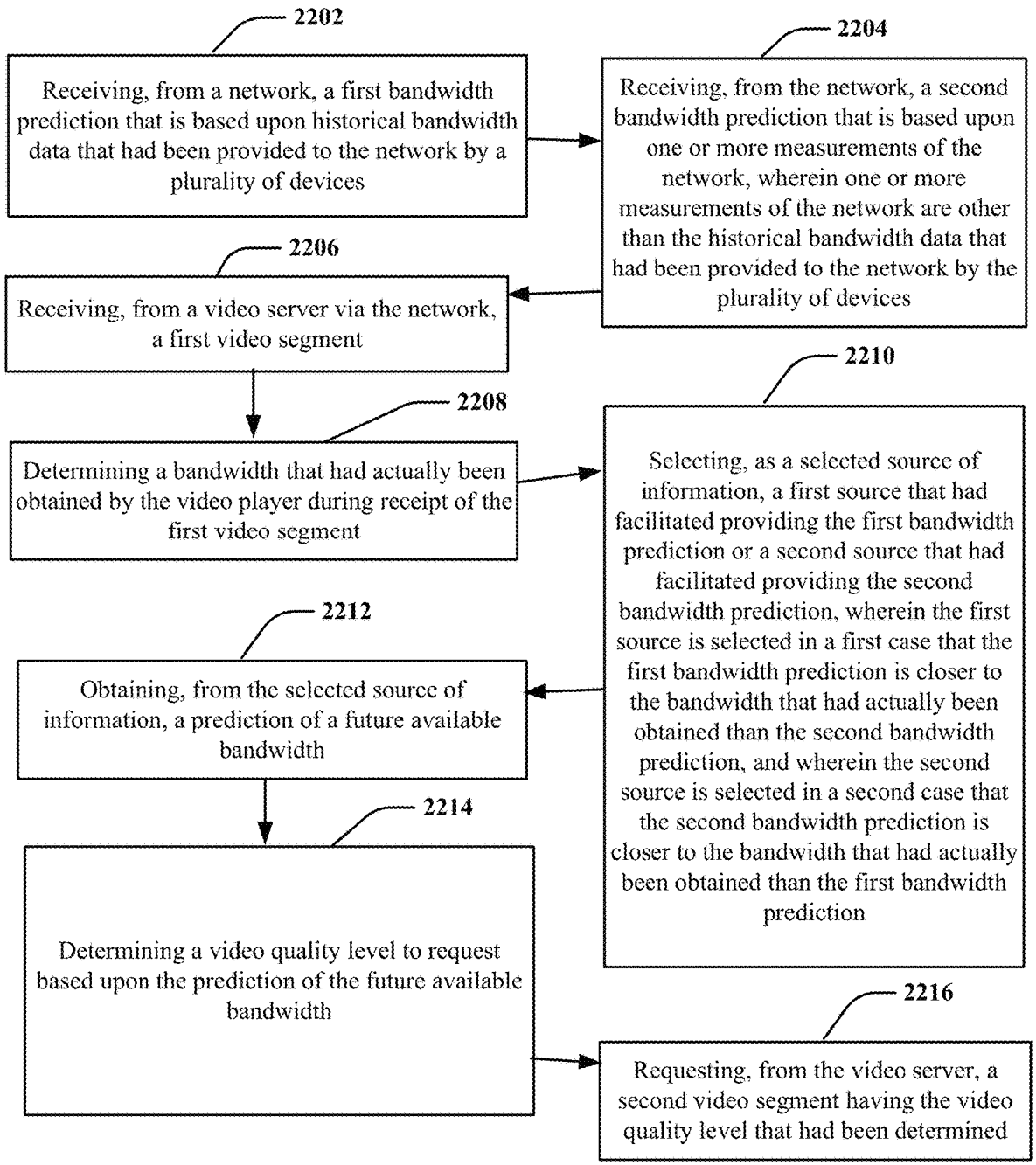
FIG. 2C depicts an illustrative embodiment of a method in accordance with various aspects described herein.

Referring now to FIG. 2C, various steps of a method 2200 according to an embodiment are shown. As seen in this FIG. 2C, step 2202 comprises receiving, from a network, a first bandwidth prediction that is based upon historical bandwidth data that had been provided to the network by a plurality of devices. Next, step 2204 comprises receiving, from the network, a second bandwidth prediction that is based upon one or more measurements of the network, wherein one or more measurements of the network are other than the historical bandwidth data that had been provided to the network by the plurality of devices. Next, step 2206 comprises receiving, from a video server via the network, a first video segment. Next, step 2208 comprises determining a bandwidth that had actually been obtained by the video player during receipt of the first video segment. Next, step 2210 comprises selecting, as a selected source of information, a first source that had facilitated providing the first bandwidth prediction or a second source that had facilitated providing the second bandwidth prediction, wherein the first source is selected in a first case that the first bandwidth prediction is closer to the bandwidth that had actually been obtained than the second bandwidth prediction, and wherein the second source is selected in a second case that the second bandwidth prediction is closer to the bandwidth that had actually been obtained than the first bandwidth prediction. Next, step 2212 comprises obtaining, from the selected source of information, a prediction of a future available bandwidth. Next, step 2214 comprises determining a video quality level to request based upon the prediction of the future available bandwidth. Next, step 2216 comprises requesting, from the video server, a second video segment having the video quality level that had been determined.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
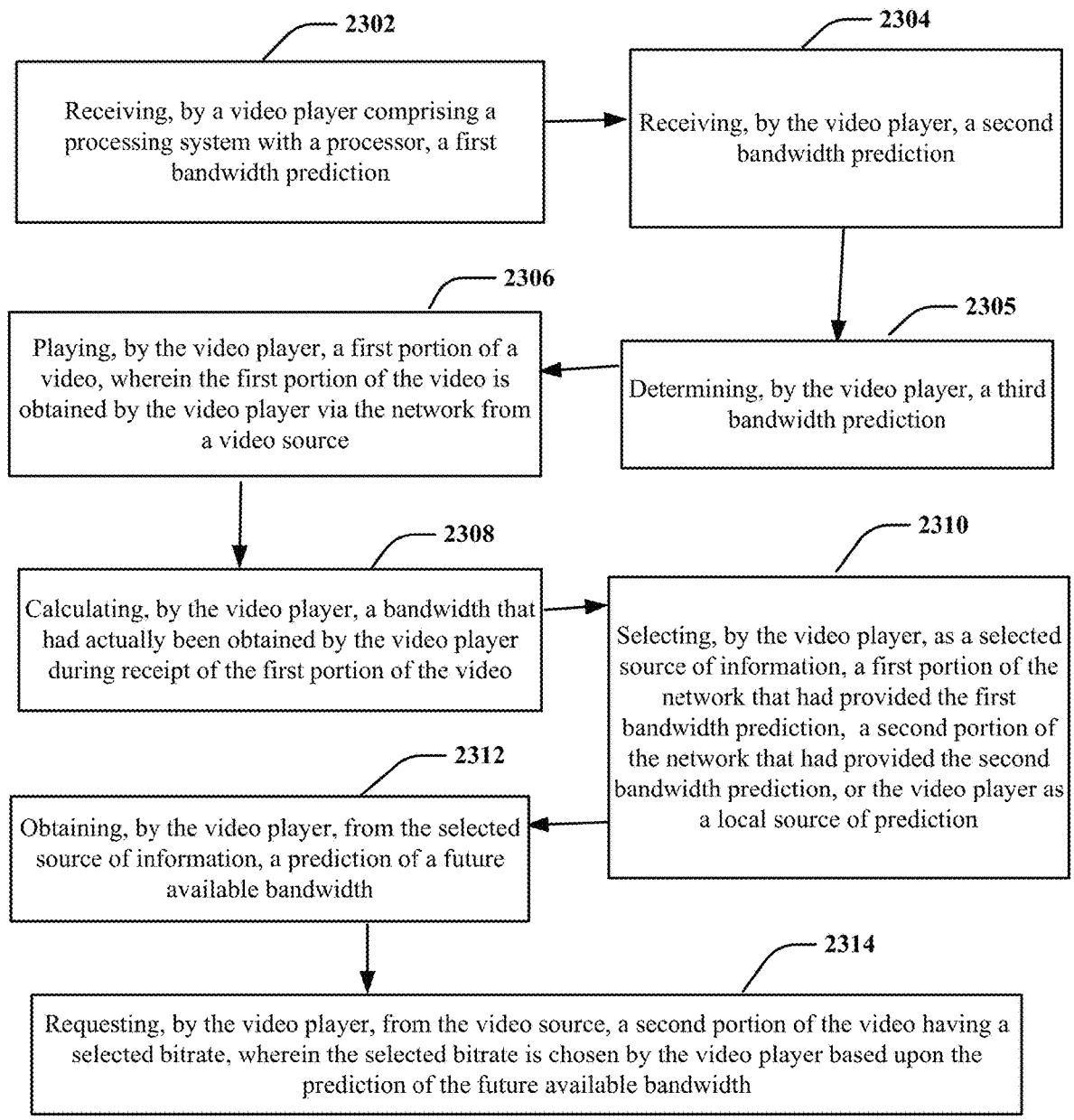
FIG. 2D depicts an illustrative embodiment of a method in accordance with various aspects described herein.

Referring now to FIG. 2D, various steps of a method 2300 according to an embodiment are shown. As seen in this FIG. 2D, step 2302 comprises receiving, by a video player comprising a processing system with a processor, a first bandwidth prediction, wherein the first bandwidth prediction is based upon historical bandwidth data that had been provided to a network by a plurality of devices, wherein the historical bandwidth data incudes first data indicative of a first historical bandwidth that had been achieved by the video player, and wherein the historical bandwidth data incudes second data indicative of a plurality of second historical bandwidths that had been achieved by other devices of the plurality of devices. Next, step 2304 comprises receiving, by the video player, a second bandwidth prediction, wherein the second bandwidth prediction is based upon one or more measurements of the network, and wherein the one or more measurements of the network are other than the historical bandwidth data that had been provided to the network by the plurality of devices. Next, step 2305 comprises determining, by the video player, a third bandwidth prediction, wherein the third bandwidth prediction is based upon the first data indicative of the first historical bandwidth that had been achieved by the video player. Next, step 2306 comprises playing, by the video player, a first portion of a video, wherein the first portion of the video is obtained by the video player via the network from a video source. Next, step 2308 comprises calculating, by the video player, a bandwidth that had actually been obtained by the video player during receipt of the first portion of the video. Next, step 2310 comprises selecting, by the video player, as a selected source of information, a first portion of the network that had provided the first bandwidth prediction, a second portion of the network that had provided the second bandwidth prediction, or the video player as a local source of prediction, wherein the first portion of the network is selected in a first case that the first bandwidth prediction is closer to the bandwidth that had been actually obtained than both the second bandwidth prediction and the third bandwidth prediction, wherein the second portion is selected in a second case that the second bandwidth prediction is closer to the bandwidth that had been actually obtained than both the first bandwidth prediction and the third bandwidth prediction, and wherein the video player as the local source of prediction is selected in a third case that the third bandwidth prediction is closer to the bandwidth that had been actually obtained than both the first bandwidth prediction and the second bandwidth prediction. Next, step 2312 comprises obtaining, by the video player, from the selected source of information, a prediction of a future available bandwidth. Next, step 2314 comprises requesting, by the video player, from the video source, a second portion of the video having a selected bitrate, wherein the selected bitrate is chosen by the video player based upon the prediction of the future available bandwidth. In one example, the video player can then play the video as the video is received at the selected bitrate.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
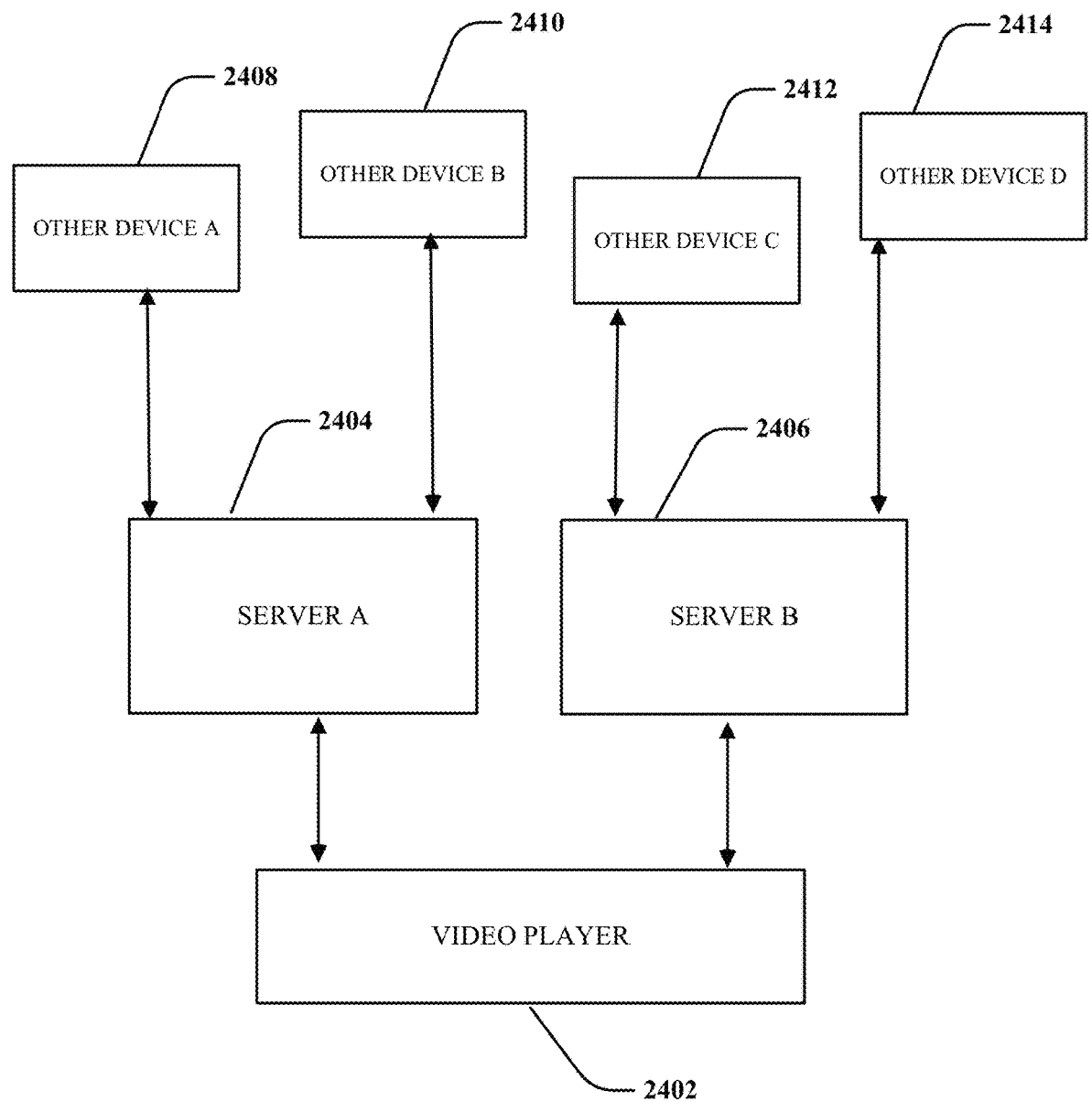
FIG. 2E is a block diagram illustrating an example, non-limiting embodiment of a system 2400 (which can function, for example, fully or partially within the communication network 100 of FIG. 1) in accordance with various aspects described herein.

Referring now to FIG. 2E, it is seen that system 2400 can include Video Player 2402, Server "A" 2404, and Server "B" 2406. This system 2400 can also include Other Device A 2408, Other Device B 2410, Other Device C 2412 and Other Device D 2414 (each of which can be a video player and/or another type of network-connectable device). In this embodiment, Server "A" 2404 acts as a first source of prediction information to the Video Player 2402 and/or provides a first type of prediction information to the Video Player 2402. Further, Server "B" 2406 acts as a second source of prediction information to the Video Player 2402 and/or provides a second type of prediction information to the Video Player 2402. In one example, the Video Player 2402 is in bi-directional communication with each of Server "A" 2404 and Server "B" 2406. In another example, each of Other Device A 2408 and Other Device B 2410 is in bi-directional communication with Server A 2404. In another example, each of Other Device C 2412 and Other Device D 2414 is in bi-directional communication with Server B 2406. In another example, the bi-directional communication is via a network (for instance, the Internet).

Figure 2F:
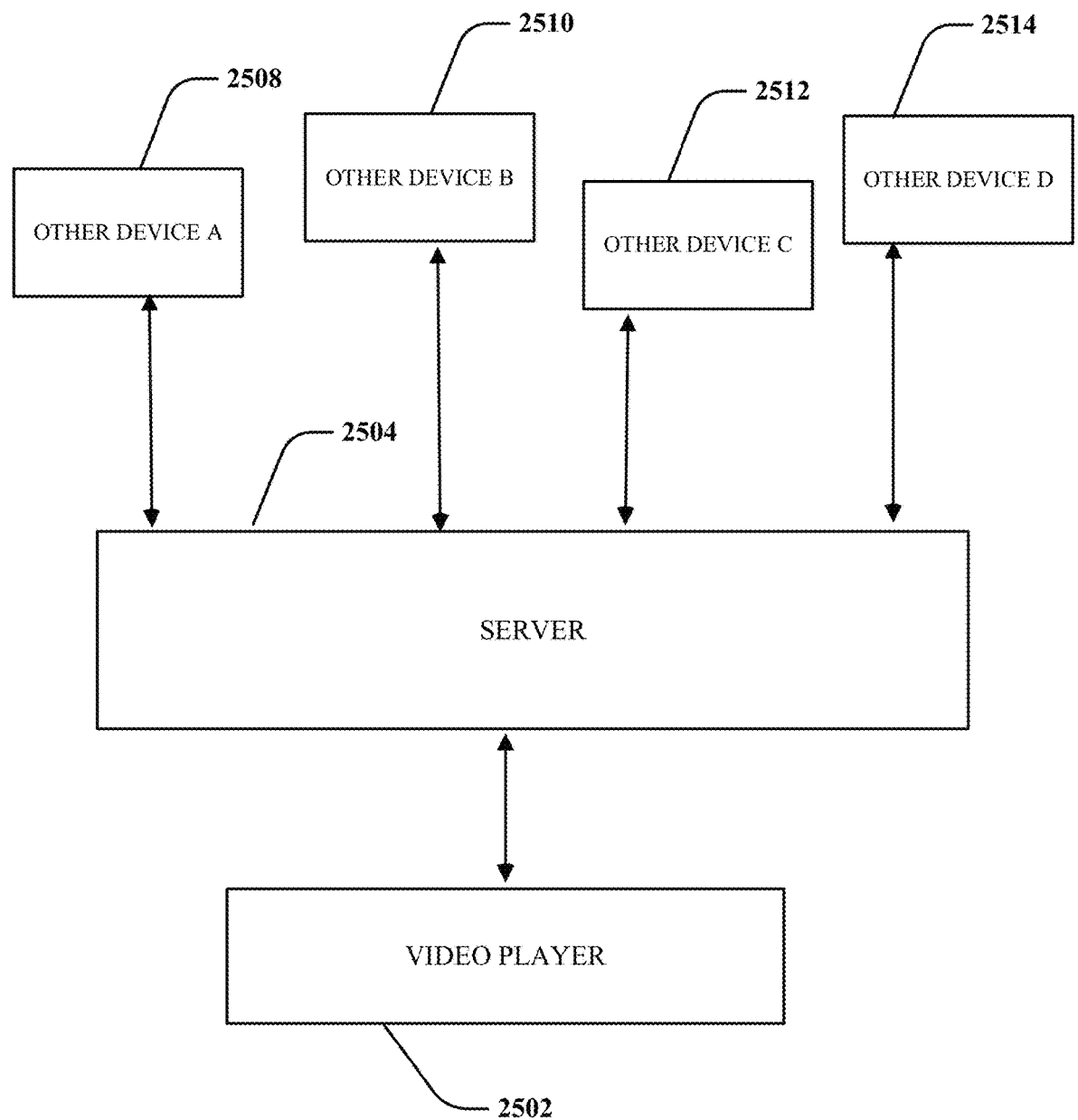
FIG. 2F is a block diagram illustrating an example, non-limiting embodiment of a system 2500 (which can function, for example, fully or partially within the communication network 100 of FIG. 1) in accordance with various aspects described herein.

Referring now to FIG. 2F, it is seen that system 2500 can include Video Player 2502 and Server 2504. This system 2500 can also include Other Device A 2508, Other Device B 2510, Other Device C 2512 and Other Device D 2514 (each of which can be a video player and/or another type of network-connectable device). In this embodiment, Server 2504: (a) acts as both a first source of prediction information to the Video Player 2502 and as a second source of prediction information to the Video Player 2502; and/or (b) provides both a first type of prediction information to the Video Player 2502 and a second type of prediction information to the Video Player 2502. In one example, the Video Player 2502 is in bi-directional communication with Server 2504. In another example, each of Other Device A 2508, Other Device B 2510, Other Device C 2512 and Other Device D 2514 is in bi-directional communication with Server 2504. In another example, the bi-directional communication is via a network (for instance, the Internet).

As described herein, a number of techniques can be utilized to predict bandwidth (e.g., network bandwidth) that will be available for a device (e.g., a client device such as a video player): locally-based prediction (e.g., local historical throughput); and network-based prediction (e.g., historical throughput and/or metric measurements). Historical throughput can be determined based upon previous communications (e.g., video chunks). Such historical throughput can be used to derive a bandwidth prediction (e.g., considering the moving average of the historical throughput computed over the last N chunks). Network-based prediction (which, for example, can be received from an "oracle" or other remote source) can result in accurate bandwidth prediction using several strategies: (1) perform a similar task as the player; (2) use historical throughput (e.g. from many players, wherein the information related to the many players can be combined into a source of good predictions leading to good decisions in terms of selected future quality); and/or (3) analysis of network metrics, such as radio conditions in a cellular network (wherein such analysis can be combined into a source of good predictions leading to good decisions in terms of selected future quality). One or more of, for example, the network-based approaches can use a machine learning (ML) approach.

Various embodiments can provide for a player having access to both local and network-based information and deciding which one to "believe" or prioritize and ultimately use. In one example, local historical throughput can be used as a validation of network throughput. In one example, local historical throughput can be used to continuously evaluate the quality of the network data. In one specific example, a threshold-based system facilitates selecting of the best data source, and/or facilitates switching (possibly back and forth) between two or more data sources (e.g., when the network-based predictions have an accuracy higher than 90%, the player will prefer these predictions). In another example, local historical throughput can be used as a fallback mechanism in the absence of network data or in the presence of inaccurate predictions from network data.

In various embodiments, by bringing all prediction possibilities into the video player an opportunity is provided to make better decisions and to improve customer experience. In the face of a multitude of devices and network conditions that such devices can experience, this can improve robustness and adaptability. For example, an ANDROID implementation of the DIRECTV app (player) can be installed on a cellphone, tablet or an ANDROID TV box. Cellphones can be connected to different cellular operators, tablets experience various WiFi conditions and sometimes cellular, while TV boxes could operate on a high-speed backhaul or slow DSL. All of such devices could eventually end up streaming over a 5G cell. It can be impossible to know which bandwidth prediction source is the best for each device and/or condition at a given time. Therefore, according to various embodiments, having bandwidth prediction source selection implemented dynamically can provide the best solution.

Improved customer experience can be critical to reduce churn and gain new customers for a provider. Various techniques described herein can improve the overall service.

In another embodiment, the overall decision making process does not have to be limited to bandwidth prediction (it could be congestion and/or some other network state or characteristic).

In another embodiment, the implementation does not have to be limited to video players (the implementation can be applied to any application that can utilize a similar decision-making process).

As described herein, mechanisms are provided to leverage the best of both worlds—local historical throughput and network-based predictions. This combination can be valuable, as it can: (a) provide for judiciously selecting the best option; and (b) be robust to inaccurate predictions. In addition, this combination can be highly aligned with various network-predictive solutions emerging at this time.

As described herein, mechanisms can select one or more bandwidth prediction source(s) that provide: (a) local historical throughput data; (b) historical-based predictions from the network (e.g., based on historical data associated with many devices); and/or (c) real-time (instantaneous and/or near-instantaneous) predictions from the network (e.g., based on network measurements).

In one example, a selection mechanism (such as an application) can run on a tablet, a cellphone, a smartphone, or a set-top box.

In one example, a single prediction source can be used by the application/video player to make the determination as to the video quality of the next video segment. In another example, a plurality of the prediction sources (e.g., utilizing a prioritization and/or weighting) can be used by the application/video player to make the determination as to the video quality of the next video segment.

In one example, the application does not need to be associated with a video player but, instead, could be any application that changes behavior based upon future throughput (and/or changes behavior based upon any other future characteristic(s)).

As described herein various mechanisms provide video player vendors certain benefits, especially as the opportunities for cloud-based adaptation and throughput prediction increase in the future.

As described herein, by providing certain throughput guidance based upon historical data of many devices, better decisions can be achieved.

As described herein, various embodiments provide for selecting the best prediction source. The selection can be performed, for example, using comparisons and/or machine learning. In one specific example, the comparisons can be based upon a "true" historical throughput value.

In one specific example, a video player can compare an actual throughput value to a value that had been predicted by a network source (e.g., based on throughput) to device whether the network source is sufficiently accurate to use in the future.

In another specific example, a video player can compare an actual throughput value to a value that had been predicted by a network source (e.g., based on network measurements) to device whether the network source is sufficiently accurate to use in the future.

In another specific example, a video player can compare a locally determined throughput value to a value that had been predicted by a network source (e.g., based on network measurements and/or based on network measurements) to device whether the local determination is sufficiently accurate to use in the future.

In another specific example, various determinations described herein can be performed in an iterative process.

In another specific example, a mechanism can arbitrate between a local historically-based prediction and one or more network-based predictions.

In another example, predictions from various sources can be tracked, analyzed, compared and/or utilized in one or more decision making processes.

In another example, network throughput prediction(s) can be based upon data associated with the device receiving the prediction(s).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 2000, and methods 2100, 2200 and 2300 presented in FIGS. 1, 2A, 2B, 2C.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
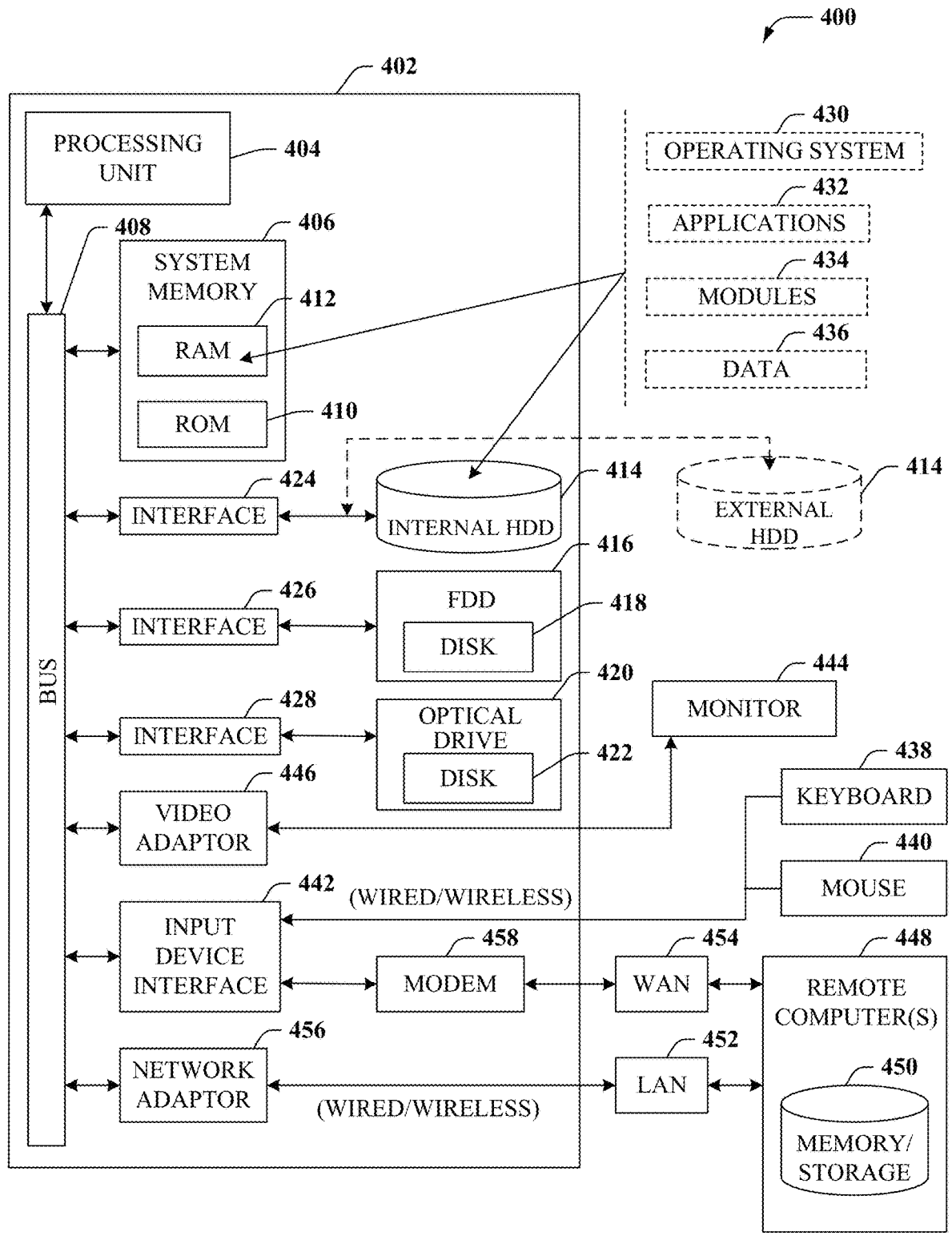
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
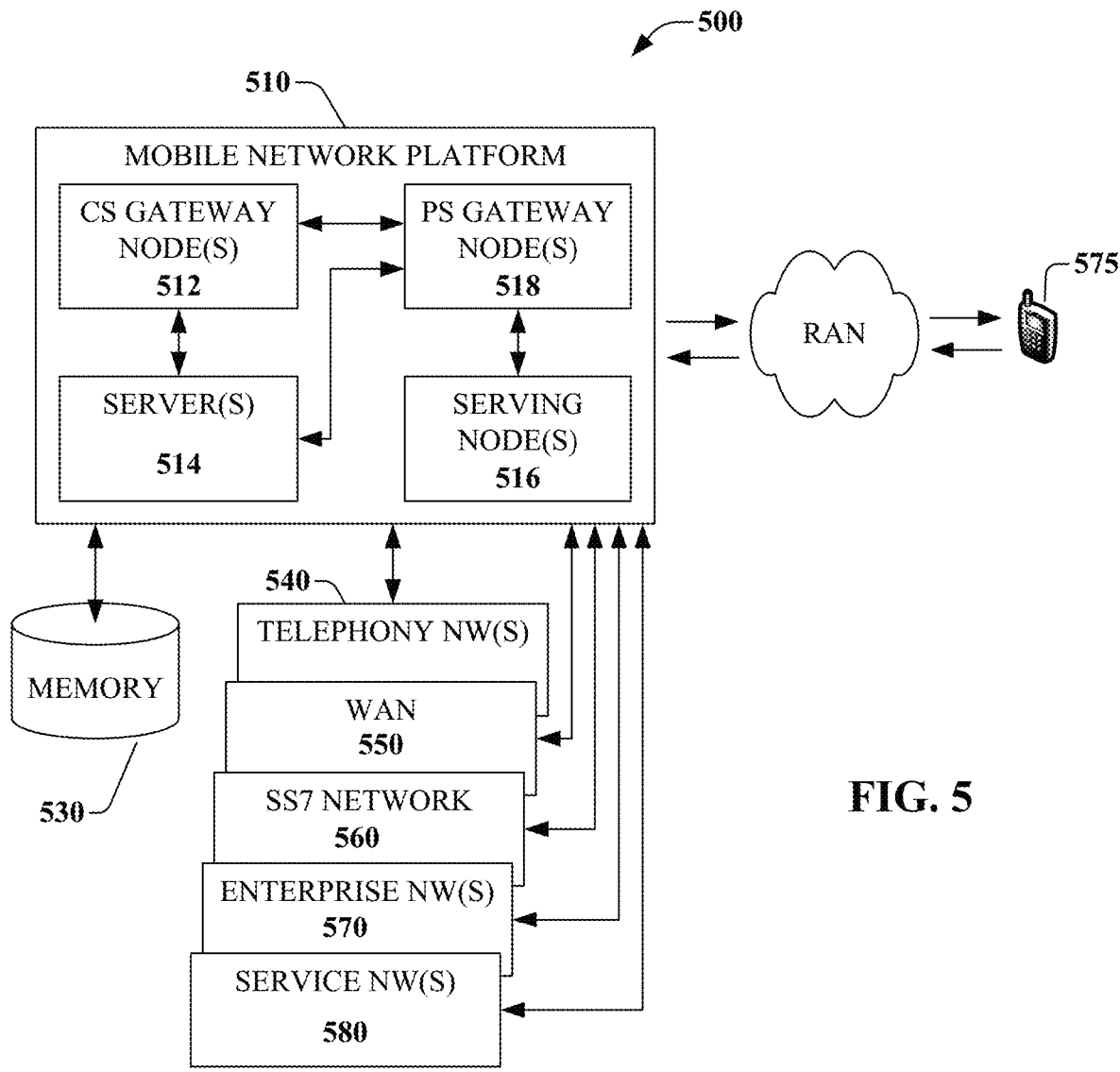
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
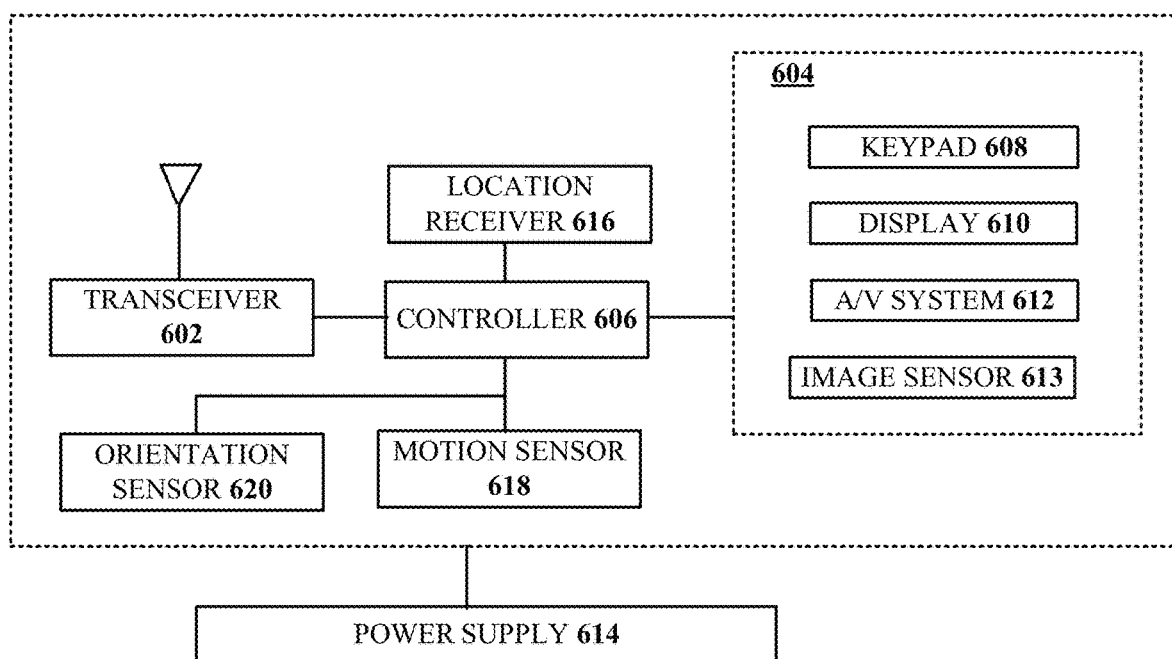
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAIVI), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically selecting bandwidth prediction source(s)) can employ various AI-based schemes for carrying out various embodiments thereof. Moreover, a classifier can be employed to determine a ranking or priority of certain items (e.g., a ranking or priority of prediction source(s) and/or a ranking or priority of prediction type(s)). A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the prediction source(s) and/or a which of the prediction type(s) to utilize, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
selecting as a source of a future bandwidth prediction either a first source of information or a second source of information, the first source of information having supplied a first bandwidth prediction that is based upon historical bandwidth data that had been provided from a plurality of devices, the second source of information having supplied a second bandwidth prediction that is based upon network measurements other than the historical bandwidth data that had been provided from the plurality of devices, the selecting being based upon a comparison of each of the first bandwidth prediction and the second bandwidth prediction to an actually obtained bandwidth of the device, and the comparison comprising a determination of whether the first bandwidth prediction or the second bandwidth prediction is closer to the actually obtained bandwidth of the device; and
selecting a video quality to request for a future video segment, the video quality being selected based upon the future bandwidth prediction that is obtained from the source of the future bandwidth prediction.

2. The device of claim 1, wherein the video quality is selected from a group of video qualities, each quality of the group of video qualities having a distinct bitrate.

3. The device of claim 1, wherein the first source of information comprises a first server that communicates with the device via a network and wherein the second source of information comprises a second server that communicates with the device via the network.

4. The device of claim 1, wherein the first source of information comprises a server that communicates with the device via a network and wherein the second source of information comprises the server that communicates with the device via the network.

5. The device of claim 1, wherein the device is a mobile communication device and wherein the first bandwidth prediction, the second bandwidth prediction, and the future bandwidth prediction are predictions of bandwidth available to the mobile communication device via a mobile communication network.

6. The device of claim 5, wherein the mobile communication device comprises a cell phone, a smartphone, a tablet, a laptop computer, or any combination thereof.

7. The device of claim 5, wherein the first bandwidth prediction is based upon the historical bandwidth data that had been provided to the mobile communication network by the plurality of devices.

8. The device of claim 1, wherein the plurality of devices includes the device.

9. The device of claim 1, wherein the device is configured to communicate with a network, and wherein the second bandwidth prediction is based upon the network measurements that are associated with the network.

10. The device of claim 1, wherein the network measurements are carried out by one or more elements of a network with which the device is configured to communicate.

11. The device of claim 1, wherein the network measurements comprise one or more signal-to-noise ratios, one or more signal qualities, one or more radio resource utilizations, or any combination thereof.

12. The device of claim 1, wherein:
the first source of information is selected as the source of the future bandwidth prediction in a first case that the first bandwidth prediction is closer to the actually obtained bandwidth of the device than the second bandwidth prediction; and
the second source of information is selected as the source of the future bandwidth prediction in a second case that the second bandwidth prediction is closer to the actually obtained bandwidth of the device than the first bandwidth prediction.

13. The device of claim 1, wherein the actually obtained bandwidth of the device is determined by the device.

14. The device of claim 13, wherein the actually obtained bandwidth of the device is determined by the device from information that is local to the device and wherein each of the first source of information and the second source of information are remote relative to the device.

15. A non-transitory, machine-readable storage medium comprising executable instructions that, when executed by a processing system of a video player including a processor, facilitate performance of operations, the operations comprising:
selecting, by the processing system, as a source of a future bandwidth prediction either a first source of information or a second source of information, the first source of information having supplied a first bandwidth prediction that is based upon historical bandwidth data that had been provided to a server on a network from a plurality of devices, the second source of information having supplied a second bandwidth prediction that is based upon network measurements other than the historical bandwidth data that had been provided from the plurality of devices, the selecting being based upon a comparison of each of the first bandwidth prediction and the second bandwidth prediction to an actually obtained bandwidth of the processing system during receipt of a first video segment by the processing system, and the comparison comprising a determination of whether the first bandwidth prediction or the second bandwidth prediction is closer to the actually obtained bandwidth of the processing system;
selecting a bitrate corresponding to a video quality to request for a future video segment, the bitrate being selected based upon the future bandwidth prediction that is obtained from the source of the future bandwidth prediction; and
requesting, from the processing system, the future video segment having the bitrate that had been selected.

16. The non-transitory, machine-readable storage medium of claim 15, wherein the bitrate is selected from a group of bitrates.

17. The non-transitory, machine-readable storage medium of claim 16, wherein the network measurements comprise one or more signal-to-noise ratios, one or more signal qualities, one or more radio resource utilizations, or any combination thereof.

18. A method comprising:
selecting, by a video player comprising a processing system with a processor, as a source of a future bandwidth prediction either a first source of information or a second source of information, the first source of information having supplied a first bandwidth prediction that is based upon historical bandwidth data that had been provided from a plurality of devices, the second source of information having supplied a second bandwidth prediction that is based upon network measurements other than the historical bandwidth data that had been provided from the plurality of devices, the selecting being based upon a comparison of each of the first bandwidth prediction and the second bandwidth prediction to an actually obtained bandwidth of the video player while receiving a first portion of video, and the comparison comprising a determination of whether the first bandwidth prediction or the second bandwidth prediction is closer to the actually obtained bandwidth of the video player while receiving the first portion of video; and selecting a video quality to request for a second portion of video, the video quality being selected based upon the future bandwidth prediction that is obtained from the source of the future bandwidth prediction; and requesting, by the video player, from a video source, the second portion of the video having the video quality.

19. The method of claim 18, wherein the video source comprises a video server on the network.

20. The method of claim 18, wherein the network measurements comprise one or more signal-to-noise ratios, one or more signal qualities, one or more radio resource utilizations, or any combination thereof.

* * * * *